(12) United States Patent
Keoshkerian et al.

(10) Patent No.: US 8,308,286 B2
(45) Date of Patent: Nov. 13, 2012

(54) CURABLE PHASE CHANGE INK CONTAINING ALKOXYSILANE MONOMER

(75) Inventors: Barkev Keoshkerian, Thornhill (CA); Michelle N. Chretien, Mississauga (CA); Naveen Chopra, Oakville (CA); Peter G. Odell, Mississauga (CA); Nicole Weckman, Kitchener (CA)

(73) Assignee: Xerox Corporation, Norwalk, CT (US)

( * ) Notice: Subject to any disclaimer, the term of this patent is extended or adjusted under 35 U.S.C. 154(b) by 270 days.

(21) Appl. No.: 12/881,921

(22) Filed: Sep. 14, 2010

(65) Prior Publication Data

US 2012/0062669 A1   Mar. 15, 2012

(51) Int. Cl.
B41J 2/01     (2006.01)
B41J 2/175    (2006.01)
B41M 5/00     (2006.01)
C08F 220/56   (2006.01)

(52) U.S. Cl. ........ 347/102; 347/87; 428/32.12; 524/547
(58) Field of Classification Search .......................... None
See application file for complete search history.

(56) References Cited

U.S. PATENT DOCUMENTS

| | | | |
|---|---|---|---|
| 3,653,932 A | 4/1972 | Berry et al. |
| 4,390,369 A | 6/1983 | Merritt et al. |
| 4,484,948 A | 11/1984 | Merritt et al. |
| 4,684,956 A | 8/1987 | Ball |
| 4,851,045 A | 7/1989 | Taniguchi |
| 4,889,560 A | 12/1989 | Jaeger et al. |
| 5,006,170 A | 4/1991 | Schwarz et al. |
| 5,151,120 A | 9/1992 | You et al. |
| 5,195,430 A | 3/1993 | Rise |
| 5,231,135 A | 7/1993 | Machell et al. |
| 5,372,852 A | 12/1994 | Titterington et al. |
| 5,496,879 A | 3/1996 | Griebel et al. |
| 5,621,022 A | 4/1997 | Jaeger et al. |
| 5,645,632 A | 7/1997 | Pavlin |
| 5,783,657 A | 7/1998 | Pavlin et al. |
| 5,863,319 A | 1/1999 | Baker et al. |
| 5,998,570 A | 12/1999 | Pavlin et al. |
| 6,221,137 B1 | 4/2001 | King et al. |
| 6,472,523 B1 | 10/2002 | Banning et al. |
| 6,476,219 B1 | 11/2002 | Duff et al. |
| 6,547,380 B2 | 4/2003 | Smith et al. |
| 6,576,747 B1 | 6/2003 | Carlini et al. |
| 6,576,748 B1 | 6/2003 | Carlini et al. |
| 6,590,082 B1 | 7/2003 | Banning et al. |
| 6,646,111 B1 | 11/2003 | Carlini et al. |
| 6,663,703 B1 | 12/2003 | Wu et al. |
| 6,673,139 B1 | 1/2004 | Wu et al. |
| 6,696,552 B2 | 2/2004 | Mayo et al. |
| 6,713,614 B2 | 3/2004 | Carlini et al. |
| 6,726,755 B2 | 4/2004 | Titterington et al. |
| 6,755,902 B2 | 6/2004 | Banning et al. |
| 6,821,327 B2 | 11/2004 | Jaeger et al. |
| 6,958,406 B2 | 10/2005 | Banning et al. |
| 7,053,227 B2 | 5/2006 | Jaeger et al. |
| 7,276,614 B2 | 10/2007 | Toma et al. |
| 7,279,587 B2 | 10/2007 | Odell et al. |
| 7,381,831 B1 | 6/2008 | Banning et al. |
| 7,427,323 B1 | 9/2008 | Birau et al. |
| 7,714,040 B2 | 5/2010 | Toma et al. |
| 2007/0120921 A1 | 5/2007 | Carlini et al. |
| 2007/0120924 A1 | 5/2007 | Odell et al. |
| 2008/0000384 A1 | 1/2008 | Belelie et al. |
| 2008/0122914 A1 | 5/2008 | Toma et al. |

FOREIGN PATENT DOCUMENTS

WO    WO 98/17704    4/1998

OTHER PUBLICATIONS

U.S. Appl. No. 12/474,946, filed May 29, 2009.

*Primary Examiner* — Stephen Meier
*Assistant Examiner* — Alexander C Witkowski
(74) *Attorney, Agent, or Firm* — Oliff & Berridge, PLC

(57) ABSTRACT

A phase change ink includes an ink vehicle that includes at least one curable carrier, at least one gellant, at least one wax and at least one alkoxysilane monomer. In a method of forming an image with the ink, the phase change ink is melted, then jetted onto an image receiving substrate, wherein the phase change ink forms a gel state, and exposed to ultraviolet light to cure the curable components of the phase change ink. The alkoxysilane participates in crosslinking to form silicon-oxygen-silicon bonds, thereby producing an ink with advantageous stability and high image quality.

20 Claims, No Drawings

CURABLE PHASE CHANGE INK CONTAINING ALKOXYSILANE MONOMER

BACKGROUND

The present disclosure generally relates to curable inks, particularly curable phase change inks, and their use in methods for forming images, particularly their use in ink jet printing. The inks herein are advantageous in curability, while being able to achieve images of high quality.

Ink jetting devices are known in the art, and thus extensive description of such devices is not required herein. As described in U.S. Pat. No. 6,547,380, incorporated herein by reference, ink jet printing systems generally are of two types: continuous stream and drop-on-demand.

In ink jetting, it is known to use phase change inks, also referred to as solid inks, gel inks and hot-melt inks. In general, phase change inks are in the solid phase at, for example, ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have been used in other printing technologies, such as gravure printing, as disclosed in, for example, U.S. Pat. No. 5,496,879, the disclosure of which is totally incorporated herein by reference. Phase change inks have also been used for applications such as postal marking, industrial marking, and labeling.

Phase change inks are desirable for ink jet printers because they remain in a solid phase at room temperature (about 20° C. to about 25° C.) during shipping, long term storage, and the like. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

REFERENCES

References disclosing phase change inks include U.S. Pat. Nos. 3,653,932, 4,390,369, 4,484,948, 4,684,956, 4,851,045, 4,889,560, 5,006,170, 5,151,120, 5,372,852 and 5,496,879, the disclosures of each of which are incorporated herein by reference. Suitable carrier materials for the inks can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

U.S. Patent Publication No. 2008/0000384 discloses several UV curable gellant inks. The gellant driven phase change preserves drop integrity in direct to paper applications and is particularly suited for a wide variety of substrates from coated papers and high quality uncoated papers to cardboard, plastic and other surfaces. The current ink designs have been demonstrated to be stable at jetting temperatures (75-85° C.) for weeks and to remain functional after several freeze-thaw cycles.

While known compositions and processes are suitable for their intended purposes, a need remains for improved phase change inks, for example for phase change inks that have improved cure at higher print speeds.

SUMMARY

These and other improvements are accomplished by the phase change inks described herein.

A phase change ink comprising an ink vehicle that includes at least one curable monomer or oligomer, at least one wax, at least one gellant and at least one alkoxysilane monomer. The wax of the ink vehicle may be a noncurable wax or a curable wax if so desired to participate in the curing of the ink.

A phase change ink comprising an ink vehicle that comprises at least one curable monomer or oligomer from about 10% to about 80% by weight of the ink, at least one gellant present in an amount from about 1% to about 50% by weight of ink, at least one wax present in an amount from about 0.1% to about 30% by weight of the ink and at least one alkoxysilane monomer present in an amount from about 10% to about 80% by weight of the ink.

A method of forming an image, comprising: melting a phase change ink comprising an ink vehicle that includes at least curable monomer or oligomer, at least one wax, at least one gellant and at least one alkoxysilane monomer; jetting the phase change ink onto an image substrate; and exposing the phase change ink on the image receiving substrate to ultraviolet light to cure the phase change ink.

DETAILED DESCRIPTION OF EMBODIMENTS

The term "curable" describes, for example, a material that may be cured via polymerization, including for example free radical routes, and/or in which polymerization is photoinitiated though use of a radiation-sensitive photoinitiator. The term "radiation-curable" refers, for example, to all forms of curing upon exposure to a radiation source, including light and heat sources and including in the presence or absence of initiators. Exemplary radiation-curing techniques include, but are not limited to, curing using ultraviolet (UV) light, for example having a wavelength of 200-400 nm or more rarely visible light, optionally in the presence of photoinitiators and/or sensitizers, curing using electron-beam radiation, optionally in the absence of photoinitiators, curing using thermal curing, in the presence or absence of high-temperature thermal initiators (and which may be largely inactive at the jetting temperature), and appropriate combinations thereof.

The phase change ink composition herein is a curable phase change ink. The ink comprises an ink vehicle that includes at least one curable carrier, at least one gellant, at least one wax and at least one alkoxysilane monomer. Optionally, the ink vehicle may also include at least one additive, for example, a photoinitiator. Additionally, the wax of the ink vehicle may be a noncurable wax or a curable wax if it is desired to have the wax participate in curing of the ink.

Exemplary ink compositions provide superior print quality while meeting requirements of piezoelectric ink jet printing processes. An exemplary ink composition includes an ink vehicle and an alkoxysilane monomer. In particular, exemplary ink compositions comprise an ink vehicle that includes a curable monomer, a gellant, and an alkoxysilane monomer. Additional exemplary ink compositions comprise an ink vehicle that comprises two or more chemically distinct curable gellants. Exemplary methods of preparing such ink compositions and exemplary methods of using such ink compositions are also described.

In embodiments, the curable phase change ink is a gel at room temperature, or the gel can be realized as the ink composition cools after being jetted onto the substrate at the jetting temperature. The curable phase change ink may also be a solid at room temperature.

When the ink compositions described herein are in the gel state, the viscosity of the ink composition is at least about 1,000 mPa·s, such as at least about 10,000 mPa·s, or at least about 100,000 mPa·s. The viscosity values in the gel state of exemplary ink compositions may be in the range of from about $10^3$ to about $10^9$ mPa·s, such as from about $10^{4.5}$ to about $10^{6.5}$ mPa·s. Gel-phase viscosity of embodiments can vary with the print process. For example, the highest viscosities may be suitable for use in exemplary embodiments that employ intermediate transfer, or when jetting directly to porous paper in order to minimize the effects of ink bleed and feathering. On the other hand, less porous substrates, such as plastic, may require lower viscosities that control dot gain and agglomeration of individual ink pixels. The gel viscosity can be controlled by ink formulation and substrate temperature.

The phase change ink may have a viscosity of less than about 35 centipoise (cP), for example from about 2 to about 30 centipoise, such as from about 5 centipoise to about 20 centipoise, and from about 7 centipoise to about 15 centipoise. The ink compositions may be jetted at temperatures of less than about 125° C., such as from about 40° C. to about 125° C., or from about 60° C. to about 120° C., such as from about 70° C. to about 110° C., such as from about 70° C. to about 90° C.

Alkoxysilane Monomer

The phase change ink also contains an alkoxysilane monomer. The alkoxysilane monomer is separate from the other components of the ink described above. The alkoxysilane monomer is any monomer having at least one alkoxy group attached to a silicon.

The alkoxysilane can form siloxane crosslinks that improve the curing of the phase change ink by hydrolysis. The formation of subsequent crosslinking produces strong silicon-oxygen-silicon bonds. The silicon-oxygen-silicon bonds significantly improve the resistance of the curable phase change ink to the cure-rub test. The alkoxysilane monomer can be incorporated into the crosslinked network via the monomer portion during the exposure to the UV irradiation. Subsequent to this the alkoxy group can then be hydrolyzed by water (either in the ambient air or by introduction of water vapor) to provide a secondary crosslinking mechanism composed of O—Si—O bonds which provide a cured image that has better rub resistance, which is a measure of curing.

When the alkoxysilane is exposed to UV light and then polymerized it is incorporated into the cured image. Subsequently upon exposure to the water molecules in the ambient air the alkoxysilane is hydrolyzed to the hydroxyl and subsequently forms the silicon-oxygen-silicon bonds in a crosslinked structure. The phase change ink could also be deliberately exposed to an atmosphere with an increased moisture content to aid in the hydrolysis and thereby further improve the curing of the curable phase change ink. The alkoxysilane moiety can continue to crosslink and cure for up to about 48 hours after printing because of the moisture in the air.

The alkoxysilane compound may have the formula:

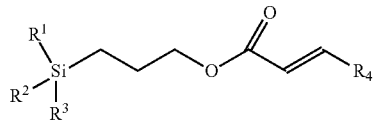

wherein:
$R^1$, $R^2$ and $R^3$ are each an alkyl group (including liner and branched, saturated and unsaturated, cyclic and acyclic, and substituted and unsubstituted alkyl groups) with from, for example, at least about 1 to about 18 carbon atoms in the alkyl chain, from about 1 to about 10 carbon atoms in the alkyl chain, from about 1 to about 8 carbon atoms in the alkyl chain and from about 1 to about 4 atoms in the alkyl chain. Furthermore, $R^1$, $R^2$ and $R^3$ may be linear alkyl groups having a same number of carbons atoms. $R^4$ is a hydrogen or a methyl group.

Specific examples of suitable alkoxysilane monomers include, for example, methacryloxypropyltriethoxysilane, methacryloxypropyltrimethoxysilane, acryloxypropyltrimethoxysilane, acryloxypropyltriethoxysilane and mixtures thereof.

The alkoxysilane monomer can be present in the ink in any desired or effective amount, for example from about 10 percent to about 80 percent by weight of the ink, such as from about 30 percent to about 70 percent by weight of the ink, and from about 40 percent to about 60 percent by weight of the ink.

Curable Monomers

The curable phase change ink may include an ink vehicle comprised of at least a gellant, at least a curable wax, an optional photoinitiator, and at least a curable monomer. In embodiments, if more than one curable liquid monomer is present in the curable phase change ink, the curable liquid monomers are referred to "co-monomers". The co-monomers may be chosen from any suitable curable monomers.

Ink compositions may comprise a first co-monomer, due to the solubility and gelling properties of gellant materials, such as, epoxy-polyamide composite gellants, which are useful for producing ink compositions including an ink vehicle having a thermally-driven and reversible gel phase, where the ink vehicle is comprised of curable liquid monomers, such as UV-curable liquid monomers. The gel phase of such ink compositions allows an ink droplet to be pinned to a receiving substrate.

Examples of the at least one curable monomer of the composition include propoxylated neopentyl glycol diacrylate (such as SR-9003 from Sartomer), diethylene glycol diacrylate, triethylene glycol diacrylate, hexanediol diacrylate, dipropyleneglycol diacrylate, tripropylene glycol diacrylate, alkoxylated neopentyl glycol diacrylate, isodecyl acrylate, tridecyl acrylate, isobornyl acrylate, isobornyl (meth)acrylate, propoxylated trimethylolpropane triacrylate, ethoxylated trimethylolpropane triacrylate, di-trimethylolpropane tetraacrylate, dipentaerythritol pentaacrylate, ethoxylated pentaerythritol tetraacrylate, propoxylated glycerol triacrylate, isobornyl methacrylate, lauryl acrylate, lauryl methacrylate, neopentyl glycol propoxylate methylether monoacrylate, isodecylmethacrylate, caprolactone acrylate, 2-phenoxyethyl acrylate, isooctylacrylate, isooctylmethacrylate, mixtures thereof and the like. As relatively non-polar monomers, mention may be made of isodecyl(meth)acrylate, caprolactone acrylate, 2-phenoxyethyl acrylate, isooctyl (meth)acrylate, and butyl acrylate. In addition, multifunctional acrylate monomers/oligomers may be used not only as reactive diluents, but also as materials that can increase the cross-link density of the cured image, thereby enhancing the toughness of the cured images.

The term "curable monomer" is also intended to encompass curable oligomers, which may also be used in the composition. Examples of suitable curable oligomers that may be used in the compositions have a low viscosity, for example, from about 50 cPs to about 10,000 cPs, such as from about 75 cPs to about 7,500 cPs or from about 100 cPs to about 5,000 cPs. Examples of such oligomers may include CN549, CN131, CN131B, CN2285, CN 3100, $CN_{3105}$, CN132, CN133, CN 132, available from Sartomer Company, Inc., Exeter, Pa., Ebecryl 140, Ebecryl 1140, Ebecryl 40, Ebecryl 3200, Ebecryl 3201, Ebecryl 3212, available from Cytec Industries Inc, Smyrna GA, PHOTOMER 3660, PHOTOMER 5006F, PHOTOMER 5429, PHOTOMER 5429F, available from Cognis Corporation, Cincinnati, Ohio, LAROMER PO 33F, LAROMER PO 43F, LAROMER PO 94F, LAROMER UO 35D, LAROMER PA 9039V, LAROMER PO 9026V, LAROMER 8996, LAROMER 8765, LAROMER 8986, available from BASF Corporation, Florham Park, N.J., and the like. As multifunctional acrylates and methacrylates, mention may also be made of pentaerythritol tetra(meth)acrylate, 1,2 ethylene glycol di(meth)acrylate, 1,6 hexanediol di(meth)acrylate, 1,12-dodecanol di(meth)acrylate, tris(2-hydroxy ethyl) isocyanurate triacrylate, propoxylated neopentyl glycol diacrylate, hexanediol diacrylate, tripropylene glycol diacrylate, dipropylene glycol diacrylate, amine-modified polyether acrylates (available as PO 83 F, LR 8869, and/or LR 8889 (all available from BASF Corporation)), trimethylolpropane triacrylate, glycerol propoxylate triacrylate, dipentaerythritol penta-/hexa-acrylate, ethoxylated pentaerythritol tetraacrylate (available from Sartomer Co. Inc. as SR 494), and the like. In addition, the acrylate and methacrylate monomers and oligomers can be included in the phase change ink carrier as reactive diluents and as materials that can increase the crosslink density of the cured image, thereby enhancing the toughness of the cured images.

In embodiments, the co-monomers may be chosen from short-chain alkyl glycol diacrylates or ether diacrylates, such as propoxylated neopentyl glycol diacrylate, and the non-fluorescent co-monomer may be chosen from acrylates having short-chain alkyl ester substituents, such as caprolactone acrylate, and the commercially available products CD536, CD 2777, CD585 and CD586 (available from Sartomer Co. Inc.).

The curable phase change ink compositions of embodiments may include one or more co-monomers in an amount ranging from about 10% to about 80% by weight, such as from about 20% to about 70% by weight, or from about 30% to about 60% by weight, relative to the total weight of the ink vehicle.

The curable phase change ink composition may include at least one gellant.

The organic gellants function to dramatically increase the viscosity of the ink vehicle and ink composition within a desired temperature range. In particular, the gellant forms a semi-solid gel in the ink vehicle at temperatures below the specific temperature at which the ink composition is jetted. The semi-solid gel phase is a physical gel that exists as a dynamic equilibrium comprised of one or more solid gellant molecules and a liquid solvent. The semi-solid gel phase is a dynamic networked assembly of molecular components held together by non-covalent bonding interactions such as hydrogen bonding, Van der Waals interactions, aromatic non-bonding interactions, ionic or coordination bonding, London dispersion forces, and the like, which upon stimulation by physical forces such as temperature or mechanical agitation or chemical forces such as pH or ionic strength, can reversibly transition from liquid to semi-solid state at the macroscopic level. The ink compositions exhibit a thermally reversible transition between the semi-solid gel state and the liquid state when the temperature is varied above or below the gel-phase transition. This reversible cycle of transitioning between semi-solid gel phase and liquid phase can be repeated many times in the ink formulation. Mixtures of one or more gellants may be used to effect the phase change transition.

The phase change nature of the gellant can thus be used to cause a rapid viscosity increase in the jetted ink composition upon the substrate following jetting of the ink to the substrate. In particular, jetted ink droplets would be pinned into position on a receiving substrate, such as an image-receiving medium (for instance, paper), that is at a temperature cooler than the ink jetting temperature of the ink composition through the action of a phase change transition in which the ink composition undergoes a significant viscosity change from a liquid state to a gel state (or semi-solid state).

The temperature at which the ink composition forms the gel state is any temperature below the jetting temperature of the ink composition, for example any temperature that is about 10° C. or more below the jetting temperature of the ink composition. The gel state may be formed at temperatures from about from about 20° C. to about 85° C., such as from about 30° C. to about 80° C., from about 40° C. to about 75° C., from about 45° C. to about 65° C., or from about 40° C. to about 50° C., such as about 45° C. There is a rapid and large increase in ink viscosity upon cooling from the jetting temperature at which the ink composition is in a liquid state, to the gel transition temperature, at which the ink composition converts to the gel state.

A suitable gellant for the ink composition would gel the monomers/oligomers in the ink vehicle quickly and reversibly, and demonstrate a narrow phase change transition, for example within a temperature range of about 20° C. to about 85° C. The gel state of exemplary ink compositions should exhibit a minimum of $10^{2.5}$ mPa·s, such as $10^3$ mPa·s, increase in viscosity at substrate temperatures, for instance, from about 30° C. to about 70° C., compared to the viscosity at the jetting temperature. In particular embodiments, the gellant-containing ink compositions rapidly increase in viscosity within 5° C. to 10° C. below the jetting temperature and ultimately reach a viscosity above $10^4$ times the jetting viscosity, for example about $10^5$ times the jetting viscosity.

Gellants suitable for use in the ink compositions include a curable gellant comprised of a curable amide, a curable polyamide-epoxy acrylate component and a polyamide component, a curable composite gellant comprised of a curable epoxy resin and a polyamide resin, mixtures thereof and the like, as disclosed in U.S. patent application Ser. No. 12/474,946, which is hereby incorporated herein by reference in its entirety. Inclusion of the gellant in the composition permits the composition to be applied over a substrate, such as on one or more portions of the substrate and/or on one or more portions of an image previously formed on the substrate, without excessive penetration into the substrate because the viscosity of the composition is quickly increased as the composition cools following application. Excessive penetration of a liquid into a porous substrate, such as paper, can lead to an undesirable decrease in the substrate opacity. The curable gellant may also participate in the curing of monomer(s) of the composition.

The gellants suitable for use in the composition may be amphiphilic in nature in order to improve wetting when the composition is utilized over a substrate having silicone or other oil thereon. Amphiphilic refers to molecules that have both polar and non-polar parts of the molecule. For example, the gellants may have long non-polar hydrocarbon chains and polar amide linkages.

Amide gellants suitable for use include those described in U.S. Patent Application Publication No. 2008/0122914 and U.S. Pat. Nos. 7,276,614 and 7,279,587, the entire disclosures of which are incorporated herein by reference.

As described in U.S. Pat. No. 7,279,587, the amide gellant may be a compound of the formula

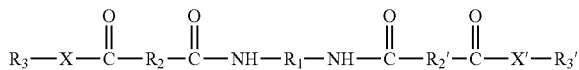

wherein:

R$_1$ is:

(i) an alkylene group (wherein an alkylene group is a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group) having from about 1 carbon atom to about 12 carbon atoms, such as from about 1 carbon atom to about 8 carbon atoms or from about 1 carbon atom to about 5 carbon atoms, (ii) an arylene group (wherein an arylene group is a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group) having from about 1 carbon atom to about 15 carbon atoms, such as from about 3 carbon atoms to about 10 carbon atoms or from about 5 carbon atoms to about 8 carbon atoms, (iii) an arylalkylene group (wherein an arylalkylene group is a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group) having from about 6 carbon atoms to about 32 carbon atoms, such as from about 6 carbon atoms to about 22 carbon atoms or from about 6 carbon atoms to about 12 carbon atoms, or (iv) an alkylarylene group (wherein an alkylarylene group is a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group) having from about 5 carbon atoms to about 32 carbon atoms, such as from about 6 carbon atoms to about 22 carbon atoms or from about 7 carbon atoms to about 15 carbon atoms, wherein the substituents on the substituted alkylene, arylene, arylalkylene, and alkylarylene groups can be halogen atoms, cyano groups, pyridine groups, pyridinium groups, ether groups, aldehyde groups, ketone groups, ester groups, amide groups, carbonyl groups, thiocarbonyl groups, sulfide groups, nitro groups, nitroso groups, acyl groups, azo groups, urethane groups, urea groups, mixtures thereof, and the like, wherein two or more substituents can be joined together to form a ring;

$R_2$ and $R_2'$ each, independently of the other, are:
(i) alkylene groups having from about 1 carbon atom to about 54 carbon atoms, such as from about 1 carbon atom to about 48 carbon atoms or from about 1 carbon atom to about 36 carbon atoms,
(ii) arylene groups having from about 5 carbon atoms to about 15 carbon atoms, such as from about 5 carbon atoms to about 13 carbon atoms or from about 5 carbon atoms to about 10 carbon atoms,
(iii) arylalkylene groups having from about 6 carbon atoms to about 32 carbon atoms, such as from about 7 carbon atoms to about 33 carbon atoms or from about 8 carbon atoms to about 15 carbon atoms, or
(iv) alkylarylene groups having from about 6 carbon atoms to about 32 carbon atoms, such as from about 6 carbon atoms to about 22 carbon atoms or from about 7 carbon atoms to about 15 carbon atoms, wherein the substituents on the substituted alkylene, arylene, arylalkylene, and alkylarylene groups may be halogen atoms, cyano groups, ether groups, aldehyde groups, ketone groups, ester groups, amide groups, carbonyl groups, thiocarbonyl groups, phosphine groups, phosphonium groups, phosphate groups, nitrile groups, mercapto groups, nitro groups, nitroso groups, acyl groups, acid anhydride groups, azide groups, azo groups, cyanato groups, urethane groups, urea groups, mixtures thereof, and the like, and wherein two or more substituents may be joined together to form a ring;

$R_3$ and $R_3'$ each, independently of the other, are either:
(a) photoinitiating groups, such as groups derived from 1-(4-(2-hydroxyethoxy)phenyl)-2-hydroxy-2-methylpropan-1-one, of the formula

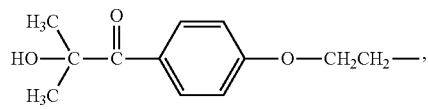

groups derived from 1-hydroxycyclohexylphenylketone, of the formula

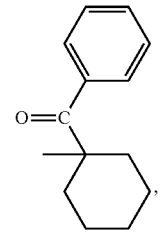

groups derived from 2-hydroxy-2-methyl-1-phenylpropan-1-one, of the formula

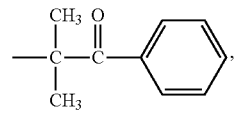

groups derived from N,N-dimethylethanolamine or N,N-dimethylethylenediamine, of the formula

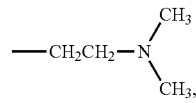

or the like, or:
(b) a group which is:
(i) an alkyl group (including linear and branched, saturated and unsaturated, cyclic and acyclic, and substituted and unsubstituted alkyl groups, and wherein heteroatoms, such as oxygen, nitrogen, sulfur, silicon, phosphorus, boron, and the like either may or may not be present in the alkyl group) having from about 2 carbon atoms to about 100 carbon atoms, such as from about 3 carbon atoms to about 60 carbon atoms or from about 4 carbon atoms to about 30 carbon atoms, (ii) an aryl group (including substituted and unsubstituted aryl groups, and wherein heteroatoms, such as oxygen, nitrogen, sulfur, silicon, phosphorus, boron, and the like either may or may not be present in the aryl group) having from about 5 carbon atoms to about 100 carbon atoms, such as from about 5 carbon atoms to about 60 carbon atoms or from about 6 carbon atoms to about 30 carbon atoms, such as phenyl or the like, (iii) an arylalkyl group (including substituted and unsubstituted arylalkyl groups, wherein the alkyl portion of the arylalkyl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkyl group) having from about 5 carbon atoms to about 100 carbon atoms, such as from about 5 carbon atoms to about 60 carbon atoms or from about 6 carbon atoms to about 30 carbon atoms, such as benzyl or the like, or (iv) an alkylaryl group (including substituted and unsubstituted alkylaryl groups, wherein the alkyl portion of the alkylaryl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylaryl group) having from about 5 carbon atoms to about 100 carbon atoms, such as from about 5 carbon atoms to about 60 carbon atoms or from about 6 carbon atoms to about 30 carbon atoms, such as tolyl or the like, wherein the substituents on the substituted alkyl, arylalkyl, and alkylaryl groups may be halogen atoms, ether groups, aldehyde groups, ketone groups, ester groups, amide groups, carbonyl groups, thiocarbonyl groups, sulfide groups, phosphine groups, phosphonium groups, phosphate groups, nitrile groups, mercapto groups, nitro groups, nitroso groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, and wherein two or more substituents may be joined together to form a ring;

and X and X' each, independently of the other, is an oxygen atom or a group of the formula —NR$_4$—, wherein R$_4$ is:

(i) a hydrogen atom;

(ii) an alkyl group, including linear and branched, saturated and unsaturated, cyclic and acyclic, and substituted and unsubstituted alkyl groups, and wherein heteroatoms either may or may not be present in the alkyl group, having from about 5 carbon atoms to about 100 carbon atoms, such as from about 5 carbon atoms to about 60 carbon atoms or from about 6 carbon atoms to about 30 carbon atoms, (iii) an aryl group, including substituted and unsubstituted aryl groups, and wherein heteroatoms either may or may not be present in the aryl group, having from about 5 carbon atoms to about 100 carbon atoms, such as from about 5 carbon atoms to about 60 carbon atoms or from about 6 carbon atoms to about 30 carbon atoms, (iv) an arylalkyl group, including substituted and unsubstituted arylalkyl groups, wherein the alkyl portion of the arylalkyl group may be linear or branched, saturated or unsaturated, and cyclic or acyclic, and wherein heteroatoms either may or may not be present in either the aryl or the alkyl portion of the arylalkyl group, having from about 5 carbon atoms to about 100 carbon atoms, such as from about 5 carbon atoms to about 60 carbon atoms or from about 6 carbon atoms to about 30 carbon atoms, or (v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, having from about 5 carbon atoms to about 100 carbon atoms, such as from about 5 carbon atoms to about 60 carbon atoms or from about 6 carbon atoms to about 30 carbon atoms, wherein the substituents on the substituted alkyl, aryl, arylalkyl, and alkylaryl groups may be halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, and wherein two or more substituents may be joined together to form a ring.

Specific suitable substituents and gellants of the above are further set forth in U.S. Pat. Nos. 7,279,587 and 7,276,614, incorporated herein by reference in their entireties, and thus are not further detailed herein.

In embodiments, the gellant may comprise a mixture comprising:

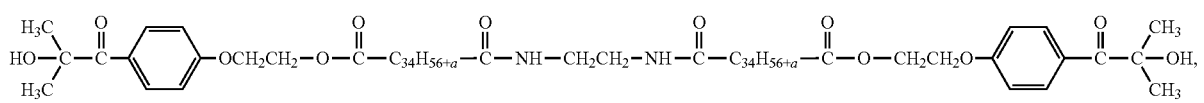

(I)

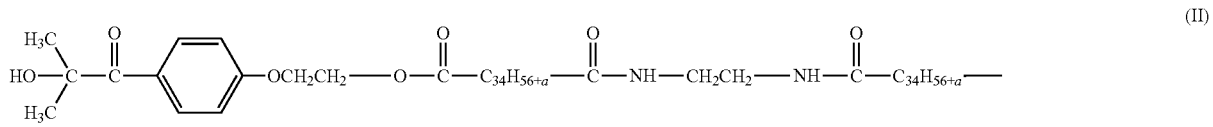

(II)

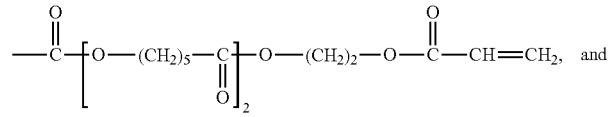

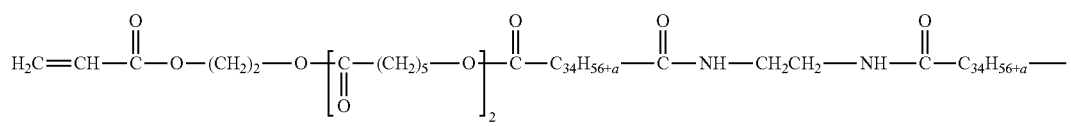

(III)

wherein —$C_{34}H_{56+a}$— represents a branched alkylene group which may include unsaturations and cyclic groups, wherein the variable "a" is an integer from 0-12.

In embodiments, the gellant may be a composite gellant, for example comprised of a curable epoxy resin and a polyamide resin. Suitable composite gellants are described in commonly assigned U.S. Patent Application Publication No. 2007/0120921, the entire disclosure of which is incorporated herein by reference.

The epoxy resin component in the composite gellant can be any suitable epoxy group-containing material. In embodiments, the epoxy group containing component includes the diglycidyl ethers of either polyphenol-based epoxy resin or a polyol-based epoxy resin, or mixtures thereof. That is, in embodiments, the epoxy resin has two epoxy functional groups that are located at the terminal ends of the molecule. The polyphenol-based epoxy resin in embodiments is a bisphenol A-co-epichlorohydrin resin with not more than two glycidyl ether terminal groups. The polyol-based epoxy resin can be a dipropylene glycol-co-epichlorohydrin resin with not more than two glycidyl ether terminal groups. Suitable epoxy resins have a weight average molecular weight in the range of from about 200 to about 800, such as from about 300 to about 700. Commercially available sources of the epoxy resins are, for example, the bisphenol-A based epoxy resins from Dow Chemical Corp. such as DER 383, or the dipropyleneglycol-based resins from Dow Chemical Corp. such as DER 736. Other sources of epoxy-based materials originating from natural sources may be used, such as epoxidized triglyceride fatty esters of vegetable or animal origins, for example epoxidized linseed oil, rapeseed oil and the like, or mixtures thereof. Epoxy compounds derived from vegetable oils such as the VIKOFLEX line of products from Arkema Inc., Philadelphia Pa. may also be used. The epoxy resin component is thus functionalized with acrylate or (meth)acrylate, vinyl ether, allyl ether and the like, by chemical reaction with unsaturated carboxylic acids or other unsaturated reagents. For example, the terminal epoxide groups of the resin become ring-opened in this chemical reaction, and are converted to (meth)acrylate esters by esterification reaction with (meth)acrylic acid.

As the polyamide component of the epoxy-polyamide composite gellant, any suitable polyamide material may be used. The polyamide may be comprised of a polyamide resin derived from a polymerized fatty acid such as those obtained from natural sources (for example, palm oil, rapeseed oil, castor oil, and the like, including mixtures thereof) or the commonly known hydrocarbon "dimer acid," prepared from dimerized C-18 unsaturated acid feedstocks such as oleic acid, linoleic acid and the like, and a polyamine, such as a diamine (for example, alkylenediamines such as ethylenediamine, DYTEK series diamines, poly(alkyleneoxy)diamines, and the like), or also copolymers of polyamides such as polyester-polyamides and polyether-polyamides. One or more polyamide resins may be used in the formation of the gellant. Commercially available sources of the polyamide resin include, for example, the VERSAMID series of polyamides available from Cognis Corporation (formerly Henkel Corp.), in particular VERSAMID 335, VERSAMID 338, VERSAMID 795 and VERSAMID 963, all of which have low molecular weights and low amine numbers. The SYLVAGEL polyamide resins from Arizona Chemical Company, and variants thereof including polyether-polyamide resins may be employed. The composition of the SYLVAGEL resins obtained from Arizona Chemical Company are described as polyalkyleneoxydiamine polyamides with the general formula,

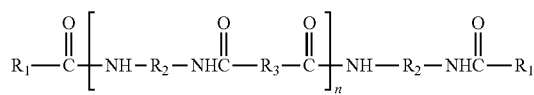

wherein $R_1$ is an alkyl group having at least seventeen carbons, $R_2$ includes a polyalkyleneoxide, $R_3$ includes a C-6 carbocyclic group, and n is an integer of at least 1, such as from 1 to about 100, from about 1 to about 50 and from about 5 to about 25.

The gellant may also comprise a curable polyamide-epoxy acrylate component and a polyamide component, such as disclosed, for example, in commonly assigned U.S. Patent Application Publication No. 2007/0120924, the entire disclosure of which is incorporated herein by reference. The curable polyamide-epoxy acrylate is curable by virtue of including at least one functional group therein. As an example, the polyamide-epoxy acrylate is difunctional. The functional group(s), such as the acrylate group(s), are curable via free-radical initiation and enable chemical bonding of the gellant to the cured ink vehicle. A commercially available polyamide-epoxy acrylate is PHOTOMER RM370 from Cognis. The curable polyamide-epoxy acrylate may also be selected from within the structures described above for the curable composite gellant comprised of a curable epoxy resin and a polyamide resin.

An ester-terminated polyamide can be employed as the gellant in the ink composition disclosed herein. Examples of ester-terminated polyamides and the preparation thereof are disclosed in, for example, U.S. Pat. No. 5,863,319, U.S. Pat. No. 5,645,632, U.S. Pat. No. 5,783,657, U.S. Pat. No. 5,998,570, U.S. Pat. No. 7,714,040 and WO 98/17704, the disclosures of each of which are totally incorporated herein by reference. For example, U.S. Pat. No. 5,783,657, discloses a low molecular weight, ester-terminated polyamide that may be blended with a liquid hydrocarbon to form a transparent composition having gel consistency. The ester-terminated polyamide is prepared by reacting "x" equivalents of dicarboxylic acid wherein at least 50 percent of those equivalents are from polymerized fatty acid, "y" equivalents of diamine such as ethylene diamine, and "z" equivalents of monoalcohol having at least 4 carbon atoms. The stoichiometry of the reaction mixture is such that $0.9 \leq \{x/(y+z)\} \leq 1.1$ and $0.1 \leq \{z/(y+z)\} \leq 0.7$. The reactants are heated until they reach reaction equilibrium. Additional examples of ester-terminated polyamides include commercially available ester-terminated polyamides such as, for example, UNI-REZ 2980 and UNICLEAR 80 and 100 (commercially available from Arizona Chemical), and the like.

The ink composition may include the gellant in any suitable amount, such as about 1% to about 50% by weight of the composition. In embodiments, the gellant may be present in an amount of about 2% to about 20% by weight of the composition, such as about 3% to about 10% by weight of the composition.

The ink composition may include at least one curable wax. The wax may be a solid at room temperature (25° C.). Inclusion of the wax may promote an increase in viscosity of the ink composition as the composition cools from the application temperature. Thus, the wax may also assist the gellant in avoiding bleeding of the composition through the substrate.

The curable wax may be any wax component that is miscible with the other components and that will polymerize with the curable monomer to form a polymer. The term wax includes, for example, any of the various natural, modified natural, and synthetic materials commonly referred to as waxes.

Suitable examples of curable waxes include waxes that include or are functionalized with curable groups. The curable groups may include, for example, an acrylate, methacrylate, alkene, allylic ether, epoxide, oxetane, and the like. These waxes can be synthesized by the reaction of a wax, such as a polyethylene wax equipped with a carboxylic acid or hydroxyl transformable functional group. The curable waxes described herein may be cured with the above curable monomer(s).

Suitable examples of hydroxyl-terminated polyethylene waxes that may be functionalized with a curable group include, but are not limited to, mixtures of carbon chains with the structure $CH_3$—$(CH_2)_n$—$CH_2OH$, where there is a mixture of chain lengths, n, where the average chain length can be in the range of about 16 to about 50, and linear low molecular weight polyethylene, of similar average chain length. Suitable examples of such waxes include, but are not limited to, the UNILIN series of materials such as UNILIN 350, UNILIN 425, UNILIN 550 and UNILIN 700 with $M_n$ approximately equal to 375, 460, 550 and 700 g/mol, respectively. All of these waxes are commercially available from Baker-Petrolite. Guerbet alcohols, characterized as 2,2-dialkyl-1-ethanols, are also suitable compounds. Exemplary Guerbet alcohols include those containing about 16 to about 36 carbons, many of which are commercially available from Jarchem Industries Inc., Newark, N.J. PRIPOL 2033 (C-36 dimer diol mixture including isomers of the formula

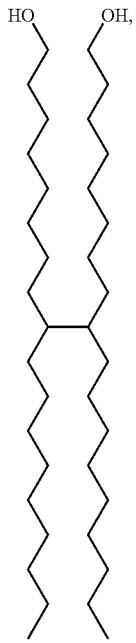

as well as other branched isomers that may include unsaturations and cyclic groups, available from Uniqema, New Castle, Del., can also be used. These alcohols can be reacted with carboxylic acids equipped with UV curable moieties to form reactive esters. Examples of these acids include acrylic and methacrylic acids, available from Sigma-Aldrich Co.

Suitable examples of carboxylic acid-terminated polyethylene waxes that may be functionalized with a curable group include mixtures of carbon chains with the structure $CH_3$—$(CH_2)_n$—$COOH$, where there is a mixture of chain lengths, n, where the average chain length is about 16 to about 50, and linear low molecular weight polyethylene, of similar average chain length. Suitable examples of such waxes include, but are not limited to, UNICID 350, UNICID 425, UNICID 550 and UNICID 700 with $M_n$ equal to approximately 390, 475, 565 and 720 g/mol, respectively. Other suitable waxes have a structure $CH_3$—$(CH_2)_n$—$COOH$, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33. Guerbet acids, characterized as 2,2-dialkyl ethanoic acids, are also suitable compounds. Exemplary Guerbet acids include those containing 16 to 36 carbons, many of which are commercially available from Jarchem Industries Inc., Newark, N.J. PRIPOL® 1009 (C-36 dimer acid mixture including isomers of the formula

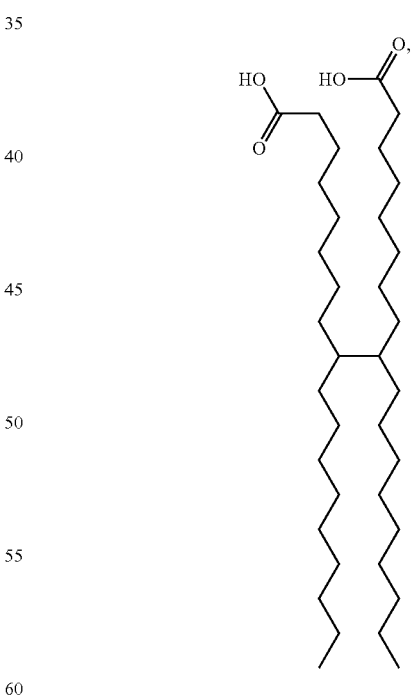

as well as other branched isomers that may include unsaturations and cyclic groups, available from Uniqema, New Castle, Del., can also be used. These carboxylic acids can be reacted with alcohols equipped with UV curable moieties to form reactive esters. Examples of these alcohols include, but are not limited to, 2-allyloxyethanol from Sigma-Aldrich Co.;

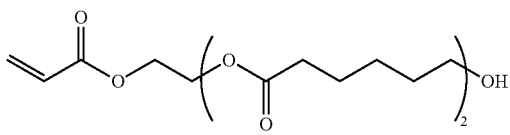

SR495B from Sartomer Company, Inc.;

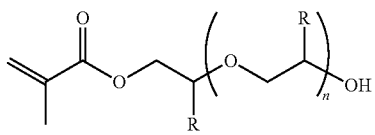

CD572 (R=H, n=10) and SR604 (R=Me, n=4) from Sartomer Company, Inc.

The curable wax can be included in the composition in an amount of from, for example, about 0.1% to about 30% by weight of the composition, such as from about 0.5% to about 20% or from about 0.5% to 15% by weight of the composition.

Optional Additives

The ink vehicles may be mixtures of curable components and, optionally, additional materials including reactive diluents, colorants, initiating agents, antioxidants, crosslinking agents, as well as any conventional optional additives. Such conventional additives may include, for example, defoamers, slip and leveling agents, pigment dispersants and the like. The inks may also include additional monomeric or polymeric materials as desired.

Colorants

The ink compositions may optionally contain a colorant. Any desired or effective colorant can be employed in the ink compositions, including dyes, pigments, mixtures thereof, and the like, provided that the colorant can be dissolved or dispersed in the ink vehicle. Pigments, which are typically cheaper and more robust than dyes, may be included in particular embodiments. The color of many dyes can be altered by the polymerization process occurring during the curing stage, presumably from attack of their molecular structure by the free radicals. The compositions can be used in combination with conventional ink-colorant materials, such as Color Index (C.I.) Solvent Dyes, Disperse Dyes, modified Acid and Direct Dyes, Basic Dyes, Sulphur Dyes, Vat Dyes, and the like.

Examples of suitable dyes include Neozapon Red 492 (BASF); Orasol Red G (Ciba); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bernachrome Yellow GD Sub (Classic Dyestuffs); Cartasol Brilliant Yellow 4GF (Clariant); Cibanon Yellow 2GN (Ciba); Orasol Black CN (Ciba); Savinyl Black RLSN(Clariant); Pyrazol Black BG (Clariant); Morfast Black 101 (Rohm & Haas); Diaazol Black RN (ICI); Orasol Blue GN (Ciba); Savinyl Blue GLS (Clariant); Luxol Fast Blue MBSN (Pylam Products); Sevron Blue 5GMF (Classic Dyestuffs); Basacid Blue 750 (BASF), Neozapon Black X51 (BASF), Classic Solvent Black 7 (Classic Dyestuffs), Sudan Blue 670 (C.I. 61554) (BASF), Sudan Yellow 146 (C.I. 12700) (BASF), Sudan Red 462 (C.I. 26050) (BASF), C.I. Disperse Yellow 238, Neptune Red Base NB543 (BASF, C.I. Solvent Red 49), Neopen Blue FF-4012 from BASF, Lampronol Black BR from ICI (C.I. Solvent Black 35), Morton Morplas Magenta 36 (C.I. Solvent Red 172), metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are herein entirely incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

Pigments are also suitable colorants for the curable phase change inks. Examples of suitable pigments include PALIOGEN Violet 5100 (commercially available from BASF); PALIOGEN Violet 5890 (commercially available from BASF); HELIOGEN Green L8730 (commercially available from BASF); LITHOL Scarlet D3700 (commercially available from BASF); SUNFAST Blue 15:4 (commercially available from Sun Chemical); Hostaperm Blue B2G-D (commercially available from Clariant); Hostaperm Blue B4G (commercially available from Clariant); Permanent Red P-F7RK; Hostaperm Violet BL (commercially available from Clariant); LITHOL Scarlet 4440 (commercially available from BASF); Bon Red C (commercially available from Dominion Color Company); ORACET Pink RF (commercially available from Ciba); PALIOGEN Red 3871 K (commercially available from BASF); SUNFAST Blue 15:3 (commercially available from Sun Chemical); PALIOGEN Red 3340 (commercially available from BASF); SUNFAST Carbazole Violet 23 (commercially available from Sun Chemical); LITHOL Fast Scarlet L4300 (commercially available from BASF); SUNBRITE Yellow 17 (commercially available from Sun Chemical); HELIOGEN Blue L6900, L7020 (commercially available from BASF); SUNBRITE Yellow 74 (commercially available from Sun Chemical); SPECTRA PAC C Orange 16 (commercially available from Sun Chemical); HELIOGEN Blue K6902, K6910 (commercially available from BASF); SUNFAST Magenta 122 (commercially available from Sun Chemical); HELIOGEN Blue D6840, D7080 (commercially available from BASF); Sudan Blue OS (commercially available from BASF); NEOPEN Blue FF4012 (commercially available from BASF); PV Fast Blue B2GO1 (commercially available from Clariant); IRGALITE Blue BCA (commercially available from Ciba); PALIOGEN Blue 6470 (commercially available from BASF); Sudan Orange G (commercially available from Aldrich), Sudan Orange 220 (commercially available from BASF); PALIOGEN Orange 3040 (BASF); PALIOGEN Yellow 152, 1560 (commercially available from BASF); LITHOL Fast Yellow 0991 K (commercially available from BASF); PALIOTOL Yellow 1840 (commercially available from BASF); NOVOPERM Yellow FGL (commercially available from Clariant); Ink Jet Yellow 4G VP2532 (commercially available from Clariant); Toner Yellow HG (commercially available from Clariant); Lumogen Yellow D0790 (commercially available from BASF); Suco-Yellow L1250 (commercially available from BASF); Suco-Yellow D1355 (commercially available from BASF); Suco Fast Yellow D1 355, D1 351 (commercially available from BASF); HOSTAPERM Pink E 02 (commercially available from Clariant); Hansa Brilliant Yellow 5GX03 (commercially available from Clariant); Permanent Yellow GRL 02 (commercially available from Clariant); Permanent Rubine L6B 05 (commercially available from Clariant); FANAL Pink D4830 (commercially available from BASF); CINQUASIA Magenta (commercially available from DU PONT); PALIOGEN Black L0084 (commercially available from BASF); Pigment Black K801 (commercially available from BASF); and carbon blacks such as REGAL 330™ (commercially available from Cabot), Nipex 150 (commercially available from Degusssa) Carbon Black 5250 and Carbon Black 5750 (commercially available from Columbia Chemical), and the like, as well as mixtures thereof.

Also suitable are the colorants disclosed in U.S. Pat. Nos. 6,472,523, 6,726,755, 6,476,219, 6,576,747, 6,713,614, 6,663,703, 6,755,902, 6,590,082, 6,696,552, 6,576,748, 6,646,111, 6,673,139, 6,958,406, 6,821,327, 7,053,227, 7,381,831 and U.S. Pat. No. 7,427,323, the disclosures of each of which are incorporated herein by reference in their entirety.

The colorant may be included in the ink composition in an amount of from, for example, about 0.1 to about 15% by weight of the ink composition, such as about 2.0 to about 9% by weight of the ink composition.

Initiators

The curable phase change ink composition may optionally include an initiator, such as, for example, a photoinitiator. In embodiments, such an initiator is desirable for assisting in curing of the ink.

In embodiments, a photoinitiator that absorbs radiation, for example UV light radiation, to initiate curing of the curable components of the ink may be used. As the photoinitiator for ink compositions of embodiments that are cured by free-radical polymerization, for instance, ink compositions containing acrylate groups or inks comprised of polyamides, mention may be made of photoinitiators such as benzophenones, benzoin ethers, benzil ketals, α-hydroxyalkylphenones, α-alkoxyalkylphenones α-aminoalkylphenones and acylphosphine photoinitiators sold under the trade designations of IRGACURE and DAROCUR from Ciba. Specific examples of suitable photoinitiators include 2,4,6-trimethylbenzoyldiphenylphosphine oxide (available as BASF LUCIRIN TPO); 2,4,6-trimethylbenzoylethoxyphenylphosphine oxide (available as BASF LUCIRIN TPO-L); bis(2,4,6-trimethylbenzoyl)-phenyl-phosphine oxide (available as Ciba IRGACURE 819) and other acyl phosphines; 2-methyl-1-(4-methylthio)phenyl-2-(4-morphorlinyl)-1-propanone (available as Ciba IRGACURE 907) and 1-(4-(2-hydroxyethoxy) phenyl)-2-hydroxy-2-methylpropan-1-one (available as Ciba IRGACURE 2959); 2-benzyl 2-dimethylamino 1-(4-morpholinophenyl) butanone-1 (available as Ciba IRGACURE 369); 2-hydroxy-1-(4-(4-(2-hydroxy-2-methylpropionyl)-benzyl)-phenyl)-2-methylpropan-1-one (available as Ciba IRGACURE 127); 2-dimethylamino-2-(4-methylbenzyl)-1-(4-morpholin-4-ylphenyl)-butanone (available as Ciba IRGACURE 379); titanocenes; isopropylthioxanthone; 1-hydroxy-cyclohexylphenylketone; benzophenone; 2,4,6-trimethylbenzophenone; 4-methylbenzophenone; diphenyl-(2,4, 6-trimethylbenzoyl) phosphine oxide; 2,4,6-trimethylbenzoylphenylphosphinic acid ethyl ester; oligo(2-hydroxy-2-methyl-1-(4-(1-methylvinyl)phenyl)propanone); 2-hydroxy-2-methyl-1-phenyl-1-propanone; benzyl-dimethylketal; and mixtures thereof. Mention may also be made of amine synergists, i.e., co-initiators that donate a hydrogen atom to a photoinitiator and thereby form a radical species that initiates polymerization (amine synergists can also consume oxygen dissolved in the ink—as oxygen inhibits free-radical polymerization its consumption increases the speed of polymerization), for example such as ethyl-4-dimethylaminobenzoate and 2-ethylhexyl-4-dimethylaminobenzoate. This list is not exhaustive, and any known photoinitiator that initiates the free-radical reaction upon exposure to a desired wavelength of radiation such as UV light can be used without limitation.

The photoinitiator may absorb radiation of about 200 to about 420 nm wavelengths in order to initiate cure, although use of initiators that absorb at longer wavelengths, such as the titanocenes that may absorb up to 560 nm, can also be used without restriction.

The total amount of initiator included in the ink composition may be from, for example, about 0.5 to about 15% by weight, such as from about 1 to about 10% by weight, of the ink composition.

Antioxidants

The curable phase change ink compositions can also optionally contain an antioxidant. The optional antioxidants of the ink compositions protect the images from oxidation and also protect the ink components from oxidation during the heating portion of the ink preparation process. Specific examples of suitable antioxidant stabilizers include NAUGARD 524, NAUGARD 635, NAUGARD A, NAUGARD I-403, and NAUGARD 959, commercially available from Crompton Corporation, Middlebury, Conn.; IRGANOX 1010, and IRGASTAB UV 10, commercially available from Ciba Specialty Chemicals; GENORAD 16 and GENORAD 40 commercially available from Rahn AG, Zurich, Switzerland, and the like.

When present, the optional antioxidant is present in the ink compositions of embodiments in any desired or effective amount, such as at least about 0.01% by weight of the ink composition, at least about 0.1% by weight of the ink composition, or at least about 1% by weight of the ink composition.

Crosslinking Agents

The phase change inks can also optionally contain a crosslinking agent. The optional crosslinking agent can improve the curability of the phase change ink during printing. Specific examples of suitable crosslinking agents include, for example, propoxylated-(2)-neopentyl glycol diacrylate (SR9003), ethoxylated-(6)-trimethylolpropane triacrylate (SR499), dipentaerythritol penntacrylate (SR399LV), pentaacrylate ester (SR9041) and mixtures thereof.

The crosslinking agent can be present in the ink in any desired or effective amount, for example from about 0.5 percent to about 35 percent by weight of the ink, such as from about 1 percent to about 20 percent by weight of the ink, and from about 2 percent to about 15 percent by weight of the ink.

The method of forming an image may include melting the ink composition comprising an ink vehicle that includes at least one carrier, at least one gellant, at least one wax and at least one alkoxysilane monomer, jetting the phase change ink onto an image receiving substrate, and exposing the phase change ink on the image receiving substrate to ultraviolet light to cure the curable components of the phase change ink.

The inks are desirably jetted at low temperatures, in particular at temperatures, for example, below about 110° C., such as from about 40° C. to about 110° C., such as from about 50° C. to about 110° C., and from about 60° C. to about 90° C. At such low jetting temperatures, the conventional use of temperature differential between the jetted ink and the substrate upon which the ink is jetted to effect a rapid phase change in the ink (that is, from liquid to solid) may not be effective. The gellant can thus be used to affect a rapid viscosity increase in the jetted ink upon the substrate. In particular, jetted ink droplets can be pinned into position on a receiving substrate such as a final recording substrate, such as paper or transparency material, or an intermediate transfer member, such as a transfuse drum or belt, that is maintained at a temperature cooler than the ink jetting temperature of the ink through the action of a phase change transition in which the ink undergoes a significant viscosity change from a liquid state to a gel state (or semi-solid state).

The temperature at which the ink forms the gel state is any temperature below the jetting temperature of the ink, for example, any temperature that is about 5° C. to about 100° C., such as from at least about 25° C. to about 70° C., and from at least about 30° C., to about 50° C., although the temperature can be outside of these ranges. A rapid and large increase in ink viscosity occurs upon cooling from the jetting temperature, at which the ink is in a liquid state, to the gel temperature, at which the ink is in the gel state. The viscosity increase is in one specific embodiment at least a $10^{25}$-fold increase in viscosity.

The ink compositions can be prepared by any desired or suitable method. For example, the ink ingredients can be mixed together, followed by heating, to a temperature of from about 80° C. to about 120° C., and stirring until a homogeneous ink composition is obtained, followed by cooling the ink to ambient temperature, for example from about 20 to about 25° C. The inks are solid at ambient temperature.

The inks can be employed in apparatus for direct printing ink jet processes. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX 4024 papers, XEROX Image Series papers, Courtland 4024 DP paper, ruled notebook paper, bond paper, silica coated papers such as Sharp Company silica coated paper, JuJo paper, HAMMERMILL LASERPRINT paper, and the like, glossy coated papers such as XEROX® Digital Color Gloss, Sappi Warren Papers LUSTROGLOSS, and the like, PASADENA LITHO LABEL paper, transparency materials, fabrics, textile products, plastics, polymeric films, inorganic substrates such as metals, ceramics, and wood, and the like.

EXAMPLES

Table 1 illustrates the formulation of the phase change ink with an alkoxysilane monomer (Example Ink), a phase change ink with a crosslinking agent and no alkoxysilane monomer (Comparative Example Ink 1) and a phase change ink with neither a crosslinking agent nor an alkoxysilane monomer (Comparative Example Ink 2). Furthermore, the gellant in each of the Example Ink, Comparative Example Ink 1 and Comparative Example Ink 2 was an ester-terminated polyamide gellant prepared in the manner described in Example I of U.S. Pat. No. 7,714,040, the disclosure of which is incorporated by reference herein in its entirety.

TABLE 1

Ink Formulations

| Component | Example Ink | Comparative Example Ink 1 | Comparative Example Ink 2 |
|---|---|---|---|
| Gellant - Ester Terminated Polyamide of Example I of U.S. Pat. No. 7,714,040 | 7.5% | 7.5% | 7.5% |
| Wax - Unilin 350 | 5.0% | 5.0% | 5.0% |
| Antioxidant - Irgastab UV10 | 0.2% | 0.2% | 0.2% |
| Photoinitiator - IRGACURE 819 by Ciba | 1.0% | 1.0% | 1.0% |
| Photoinitiator - IRGACURE 127 by Ciba | 3.5% | 3.5% | 3.5% |
| Alkoxysilane Monomer - acryloxypropyltrimethyoxysilane | 50.0% | 0.0% | 0.0% |
| Crosslinking Agent - SR399LV | 0.0% | 5.0% | 0.0% |
| Carrier - SR9003 | 32.8% | 77.8% | 82.8% |
| Total | 100.0% | 100.0% | 100.0% |

Each of the inks in Table 1 was printed on a MYLAR sheet and exposed to UV light at 240 feet per minute (fpm) using a LIGHTHAMMER 6 UV curing system, manufactured by Fusion UV Systems, Inc. The printed images were then exposed to a normal atmosphere (ambient air/humidity) or a moisture rich atmosphere (100% humidity). The Example Ink was subjected to a cure-rub test one hour after printing and 48 hours after printing. Comparative Example Ink 1 and Comparative Example Ink 2 were both subject to a cure-rub test one hour after printing.

Curability of inks has been found to be inversely dependent on the speed at which the uncured print passes the UV light. Inks that contain conventional crosslinking agents have been found to have acceptable cure-rub test results when printed at 30 fpm. However, the inks disclosed in the present application containing the alkoxysilane monomer have been found to have acceptable cure-rub test results for print speeds of about 240 fpm or greater.

Standard cure-rub test procedures were used, in which a Q-tip was dipped into ethyl acetate and then rubbed back and forth across the image. One back and forth was considered as one rub. The image was rubbed until the underlying MYLAR could be seen. The number of rubs was then considered as a basis for determining the curability of the ink. The cure-rub test results for the Example Ink and Comparative Example Inks 1 and 2 are shown below in Table 2.

TABLE 2

Cure-Rub Test Results for the Inks In Table 1

| | Normal Atmosphere | Moisture Enriched Atmosphere |
|---|---|---|
| Example Ink - After Printing | 59 | 83 |
| Example Ink - 48 hours after printing | 65 | 91 |
| Comparative Example Ink 1 - After Printing | 6 | 6 |
| Comparative Example Ink 2 - After Printing | 31 | 37 |

As shown above in Table 2, the phase change ink containing an alkoxysilane monomer (Example Ink) that was exposed under normal atmosphere conditions and subjected to a cure-rub test 1 hour after printing has substantially improved cure-rub results compared to a phase change ink with only a crosslinking agent (Comparative Example Ink 1) or a phase change ink with neither a crosslinking agent or an alkoxysilane monomer (Comparative Example Ink 2). Also, the above results further demonstrate that the alkoxysilane monomer in the phase change ink continues to hydrolyze for at least 48 hours after printing, and thus further improves curability of the phase change ink print in both a normal atmosphere and a moisture rich atmosphere. Additionally, when the inks are exposed to an atmosphere enriched with moisture, the improvements in the curability of the phase change ink are more significant for the phase change inks containing the alkoxysilane monomer.

Although only 3-acryloxypropyltrimethoxysilane is illustrated, similar results would be expected to be realized with any other alkoxysilane within the above description.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A phase change ink comprising an ink vehicle that includes at least one curable monomer or oligomer, at least one wax, at least one gellant and at least one alkoxysilane monomer.

2. The phase change ink according to claim 1, wherein the at least one alkoxysilane monomer is of the formula:

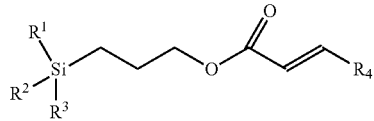

wherein $R^1$, $R^2$ and $R^3$ are each independently an alkyl group and $R^4$ is a hydrogen or a methyl group.

3. The phase change ink according to claim 2, wherein $R^1$, $R^2$ and $R^3$ are each independently an alkyl group containing at least 1 to about 18 carbon atoms.

4. The phase change ink according to claim 2, wherein $R^1$, $R^2$ and $R^3$ are linear alkyl groups having a same number of carbons atoms.

5. The phase change ink according to claim 1, wherein the at least one alkoxysilane monomer is selected from the group consisting of methacryloxypropyltriethoxysilane, methacryloxypropyltrimethoxysilane, acryloxypropyltrimethoxysilane, acryloxypropyltriethoxysilane and mixtures thereof.

6. The phase change ink according to claim 1, wherein the phase change ink is further comprised of at least one of the following additives selected from the group consisting of a reactive diluent, a initiating agent, an antioxidant, a crosslinking agent, a defoamer, a slip and leveling agent, a pigment dispersant and the like.

7. The phase change ink according to claim 1, wherein an amount of alkoxysilane monomer is from about 10 percent weight of the ink to about 80 percent weight of the ink.

8. The phase change ink according to claim 1, further comprising a colorant.

9. The phase change ink according to claim 1, wherein the phase change ink has a melt viscosity of about 1 to about 35 centipoise at a jetting temperature of from about 40° C. to about 125° C.

10. A phase change ink comprising an ink vehicle that comprises at least one curable monomer or oligomer from about 10% to about 80% by weight of the ink, at least one gellant present in an amount from about 1% to about 50% by weight of ink, at least one wax present in an amount from about 0.1% to about 30% by weight of the ink and at least one alkoxysilane monomer present in an amount from about 10% to about 80% by weight of the ink.

11. The phase change ink according to claim 10, wherein the at least one alkoxysilane monomer of the formula:

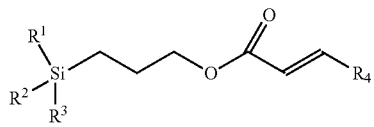

wherein $R^1$, $R^2$ and $R^3$ are each independently an alkyl group and $R^4$ is a hydrogen or a methyl group.

12. The phase change ink according to claim 11, wherein $R^1$, $R^2$ and $R^3$ are each independently an alkyl group containing at least 1 to about 18 carbon atoms.

13. The phase change ink according to claim 11, wherein $R^1$, $R^2$ and $R^3$ are each independently an alkyl group containing at least 1 to about 4 carbon atoms.

14. The phase change ink according to claim 10, further comprising a photoinitiator.

15. The phase change ink according to claim 10, further comprising a colorant in an amount from about 0.5% to about 35% by weight of the ink.

16. The method of forming an image, comprising:
melting a phase change ink comprising an ink vehicle that includes at least curable monomer or oligomer, at least one wax, at least one gellant and at least one alkoxysilane monomer;
jetting the phase change ink onto an image substrate; and
exposing the phase change ink on the image receiving substrate to ultraviolet light to cure the phase change ink.

17. The method of forming an image according to claim 16, wherein the jetting temperature is from about 40° C. to about 125° C.

18. The method of forming an image according to claim 16, wherein the exposing the phase change ink on the image receiving substrate to ultraviolet light is for an amount of time from about 0.01 seconds to about 5 seconds.

19. The method of forming an image according to claim 16, wherein the image receiving substrate is subjected to an ambient atmosphere or alternatively an atmosphere containing about 50% to about 80% moisture for up to about 48 hours after exposing the phase change ink to ultraviolet light.

20. The method of forming an image according to claim 16, wherein the curing of the curable components of the phase change inks continues up to about 48 hours after jetting the phase change ink to the image receiving substrate.

* * * * *